United States Patent
Pang

(10) Patent No.: US 10,891,289 B1
(45) Date of Patent: Jan. 12, 2021

(54) TAG COEXISTENCE DETECTION

(71) Applicant: Wavefront, Inc., Palo Alto, CA (US)

(72) Inventor: Clement Ho Yan Pang, Sunnyvale, CA (US)

(73) Assignee: Wavefront, Inc., Palo Alto, CA (US)

( * ) Notice: Subject to any disclaimer, the term of this patent is extended or adjusted under 35 U.S.C. 154(b) by 491 days.

(21) Appl. No.: 15/601,942

(22) Filed: May 22, 2017

(51) Int. Cl.
*G06F 16/2453* (2019.01)
*G06F 16/23* (2019.01)

(52) U.S. Cl.
CPC ........ *G06F 16/24542* (2019.01); *G06F 16/23* (2019.01)

(58) Field of Classification Search
CPC .............. G06F 16/58; G06F 16/90348; G06F 16/9535; G06F 16/51
See application file for complete search history.

(56) References Cited

U.S. PATENT DOCUMENTS

| | | | | |
|---|---|---|---|---|
| 9,965,527 | B2* | 5/2018 | Bullotta | H04L 43/08 |
| 10,146,822 | B1* | 12/2018 | Varteresian | G06F 16/2282 |
| 2009/0030874 | A1* | 1/2009 | Das | G06F 16/24542 |
| 2010/0010982 | A1* | 1/2010 | Broder | G06F 16/9535 |
| | | | | 707/E17.014 |
| 2014/0046917 | A1* | 2/2014 | Smith | G06F 16/27 |
| | | | | 707/696 |
| 2014/0351267 | A1* | 11/2014 | Kumar | G06F 16/3334 |
| | | | | 707/748 |
| 2015/0169645 | A1* | 6/2015 | Li | G06F 16/532 |
| | | | | 707/722 |
| 2015/0245110 | A1* | 8/2015 | Alsina | H04N 21/4722 |
| | | | | 725/34 |
| 2016/0179953 | A1* | 6/2016 | Klotz, Jr. | G06F 16/951 |
| | | | | 707/722 |
| 2016/0232157 | A1* | 8/2016 | Mansour | G06F 16/3334 |

OTHER PUBLICATIONS

Elke et al. ('Add-a-Tag: learning Adaptive User Profiles from bookmark collections', Published in: international conference on weblogs and social media, 2007) (Year: 2007).*
Venetis et al. ("On the Selection of Tags for Tag Clouds"; Publication:WSDM '11: Proceedings of the fourth ACM international conference on Web search and data miningFeb. 2011; pp. 835-844; https://doi.org/10.1145/1935826.1935855) (Year: 2011).*

* cited by examiner

*Primary Examiner* — Ken Hoang

(57) ABSTRACT

In various embodiments, a method for optimizing data storage includes receiving an input data stream, where each data record received in the data stream is tagged with a group of one or more tags. The method further includes, for each data record of data records that have been received in the data stream, using the group of one or more tags of the corresponding data record to update a data structure tracking coexistence implications of tags that have been observed together in the groups of tags of the data records. The method further includes using the data structure tracking coexistence implications of tags to optimize a query.

20 Claims, 7 Drawing Sheets

200

300

400

700

TAG COEXISTENCE DETECTION

BACKGROUND OF THE INVENTION

Data management has become more challenging with the increasing popularity of cloud and on-premise products offering a variety of technological services to users. Conventional techniques for monitoring these systems are unable to effectively manage applications that generate large quantities of data. In one aspect, conventional techniques for managing these types of systems are typically slow and/or inefficient at handling queries regarding stored data. Additional challenges include limited space available to store large quantities of data, and, in some cases, conventional systems require additional space to store information to assist query handling.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system and method of tag coexistence determination is disclosed. In various embodiments, a method includes receiving an input data stream, where each data record received in the data stream is tagged with a group of one or more tags. For each received data record, a group of one or more tags of the corresponding data record is used to update a data structure. The data structure is configured to track coexistence implications of tags that have been observed together in the groups of tags of the data records (also referred to as "implications database" or "implications table"). The method further includes using the data structure to optimize a query. By storing non-redundant tags in the data structure, the functioning of a computer or system of computers can be improved. For example, time-series data can be de-duplicated when storing in memory and/or in disk. The processes described herein allow space to be conserved and processing time to be improved.

Figure 1:
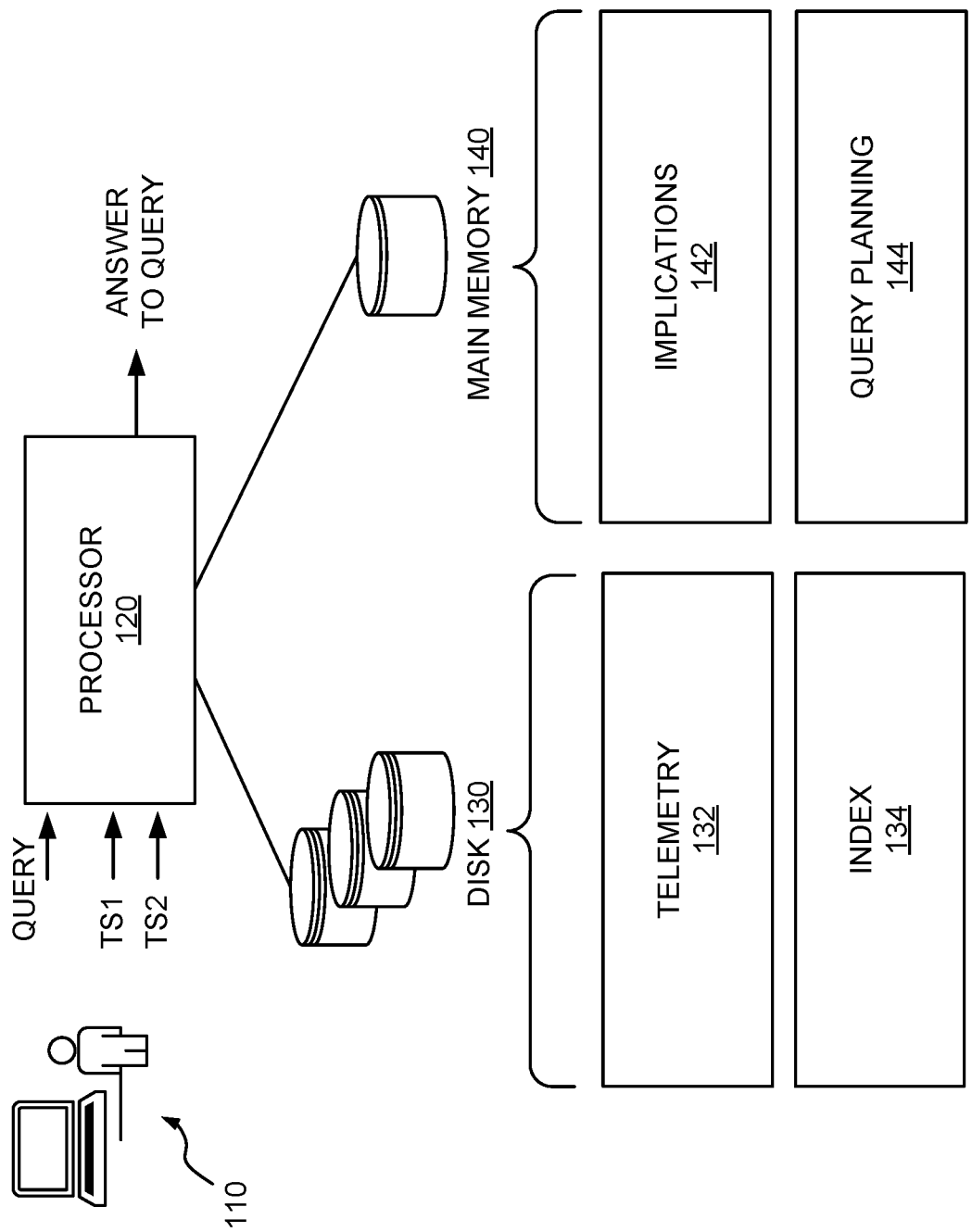
FIG. 1 is a block diagram illustrating an embodiment of a system for tag coexistence detection.

FIG. 1 is a block diagram illustrating an embodiment of a system for tag coexistence detection. In the example shown, the system includes client 110, processor 120, disk 130, and main memory 140. The system may handle both discrete data and continuous data.

The client 110 is configured to receive input from and provide output to a user. For example, a user may make queries via client 110. In various embodiments, a query is a request about time series data, e.g., time series TS1 and TS2. The time series data may be stored in a storage system such as a time series database (TSDB) (disk 130). Time series data may be discrete or continuous. For example, the data may include live data fed to a discrete stream, e.g., for a standing query. Continuous sources may include analog output representing a value as a function of time. Continuous data may be time sensitive, e.g., reacting to a declared time at which a unit of stream processing is attempted, or a constant, e.g., a 5V signal. Discrete streams may be provided to processing operations (e.g., operations of processor 120) in timestamp order. In various embodiments, if data arrives out-of-order, streams may be rewound to process data in order.

Time series data may include groups of data points and have one or more associated tags. The time series data may be received periodically from various machines. The time series data may be analyzed to determine a status of the machine and/or source of the data. Using the example of a company that provides and monitors point of sale devices, several time series data streams may be collected by the point of sale devices.

A point of sale device may report one or more metrics for a data stream. Each reported metric may have any number of tags. Suppose a metric is system battery capacity and a host is described by an operating system of the point of sale device. Tags associated with this metric and host may include a serial number of the device, a merchant ID, an API URL, a platform, a target (e.g., U.S. product), a ROM version, an app version, and an app package. The tags associated with this metric may have implications. For example, a particular merchant may use the same app version for all of their hosts. In this scenario, the merchant ID tag implies the app version tag.

The point of sale device may report other types of data. For example, a first data stream may be temperature detected by a temperature sensor provided in a point of sale device. For example, temperature may be collected every five minutes throughout the day by the sensor. The collected data is stored as a first time series data stream and tagged with an identification of the point of sale device and geographical location of the point of sale device. A second data stream is processing capacity. For example, the percentage of CPU being used is collected every 30 seconds throughout the day and stored as a second time series data stream. The second time series data stream is tagged with characteristics of the hardware and operating system of the associated point of sale device and a geographical location. The first and second time series data may be analyzed individually or aggregated to provide analytics regarding the point of sale devices. For example, queries on the time series data may be executed to determine information such as trends in temperature or CPU usage in a particular time period. In particular, suppose one point of sale device appears sluggish for a fixed period of time each day. A query may be executed on time series data to determine the cause of the sluggishness. For example, the query may be for all point of sale devices with such a pattern of sluggishness. The result of the query may help to identify the cause of the problem such as a faulty software component causing light sensors to misbehave in certain lighting conditions.

In various embodiments, a checkpointing system may pause processing to wait for a next data point and resume processing from an earlier checkpoint to maintain a processing order. In various embodiments, processing is performed based on a wall clock that drives a stream graph to produce expected output for a particular time. The wall clock may be, but need not be, equivalent to real time. For example, when processing historical data or producing a live view of time series data over a time window, the wall clock may be used to drive output from an earlier time (typically a left-most side of a timeline), moving through time and collecting values from the output, then switching to a standing mode to await discrete tuples to arrive, as the wall clock advances in real-time.

The processor 120 is configured to process input time streams according to queries. In this example, time series TS1 and/or TS2 may be processed according to the query received via client 110. The processor 120 may be configured to perform one or more of the processes described herein, e.g., the processes shown in FIGS. 2-4. An example of a processor is processor 702 of FIG. 7.

In various embodiments, the processor 120 may include a parser, a compiler, and/or an executor. A parser may be configured to parse a query, e.g., translate a received query to a language understandable by a compiler. A compiler may be configured to produce a query execution plan. For example, a compiler may receive a parsed query and determine relevant time series data to retrieve. An executor may be configured to receive commands from the compiler and perform operations on the time series data. For example, an executor may be configured to fetch data, run data through processing operations, and determine a response to the query based on the execution plan. Processes performed by processor 120 may be made more efficient by selecting and storing non-redundant information in main memory 140 and/or disk 130, as further described herein.

The disk 130 is configured to store data. In various embodiments, disk 130 is a non-volatile memory configured to store time-series data and other types of data. In some embodiments, disk 130 is configured to store a more comprehensive set of data compared with main memory 140. The data stored in disk 130 typically takes longer to access compared with main memory 140 but may be more comprehensive. In various embodiments, disk 130 stores telemetry data 132 (referred to as a "telemetry data structure" or "telemetry table"). Telemetry data may include an association between a value and a customer, metric, host, timestamp, and one or more tags. In various embodiments, disk 130 stores index data (referred to as an "index data structure" or "index table"). The index table may include an association of a last reported value or time and a customer, one or more tags, metric, and host.

The main memory 140 is configured to store data. In various embodiments, main memory 140 is a volatile memory that stores data that is quickly retrievable in response to queries (e.g., main memory 140 behaves like a cache). In various embodiments, after accessing a first set of data in disk 130, a copy of the first set of data is stored in main memory 140 to facilitate faster retrieval for subsequent queries involving the first set of data. In various embodiments, main memory 140 stores implications data (referred to as "implications data structure" or "implications table"). In various embodiments, an implication between a first tag and a second tag is an "if and only if" relationship between the two tags. That is, a first tag is seen if and only if a second tag is seen and a second tag is seen if and only if a first tag is seen. An implication means a query of the first tag has a response that is identical to a query of the second tag.

In various embodiments, main memory 140 stores query planning data (referred to as a "query planning data structure" or "query planning table"). The query planning table may facilitate query planning by making data quickly and easily accessible in anticipation of queries. The query planning table may be dynamically updated according to the processes described herein, e.g., the process of FIG. 2.

Conventionally, what is stored in main memory 140 is a mirror image of what is stored in disk 130. Here, less memory can be used and processing speed can be improved by prudently selecting and storing the selected data in main memory. For example, by determining and storing the implications and the query planning table, a single non-redundant set of data may be stored.

In operation, the system shown in FIG. 1 receives a query via client 110. The compiler determines what to retrieve from time series databases (disk 130) based on the query. For example, the compiler determines how many scans to make on the time series databases. The compiler then hands off commands to an executor to perform an execution phase, e.g., beginning execution of the query. In various embodiments, processing speed is improved by making some data (e.g., a last reported value associated with a tag) available in a query planning table 144. Where data is available in the query planning table 144, the executor need not scan the time series databases to obtain the data in response to the query. Instead, the data can be retrieved quickly from the query planning table 144. In various embodiments, the executor determines an answer to the query by looking up one or more tags of the query in a query planning table. If the tags are not found in the query planning table, then the executor looks up the tag in disk 130 (e.g., in index data structure 134). The executor then outputs an answer to the query. Although shown as a single stream, the answer to the query may include one or more streams.

Figure 2:
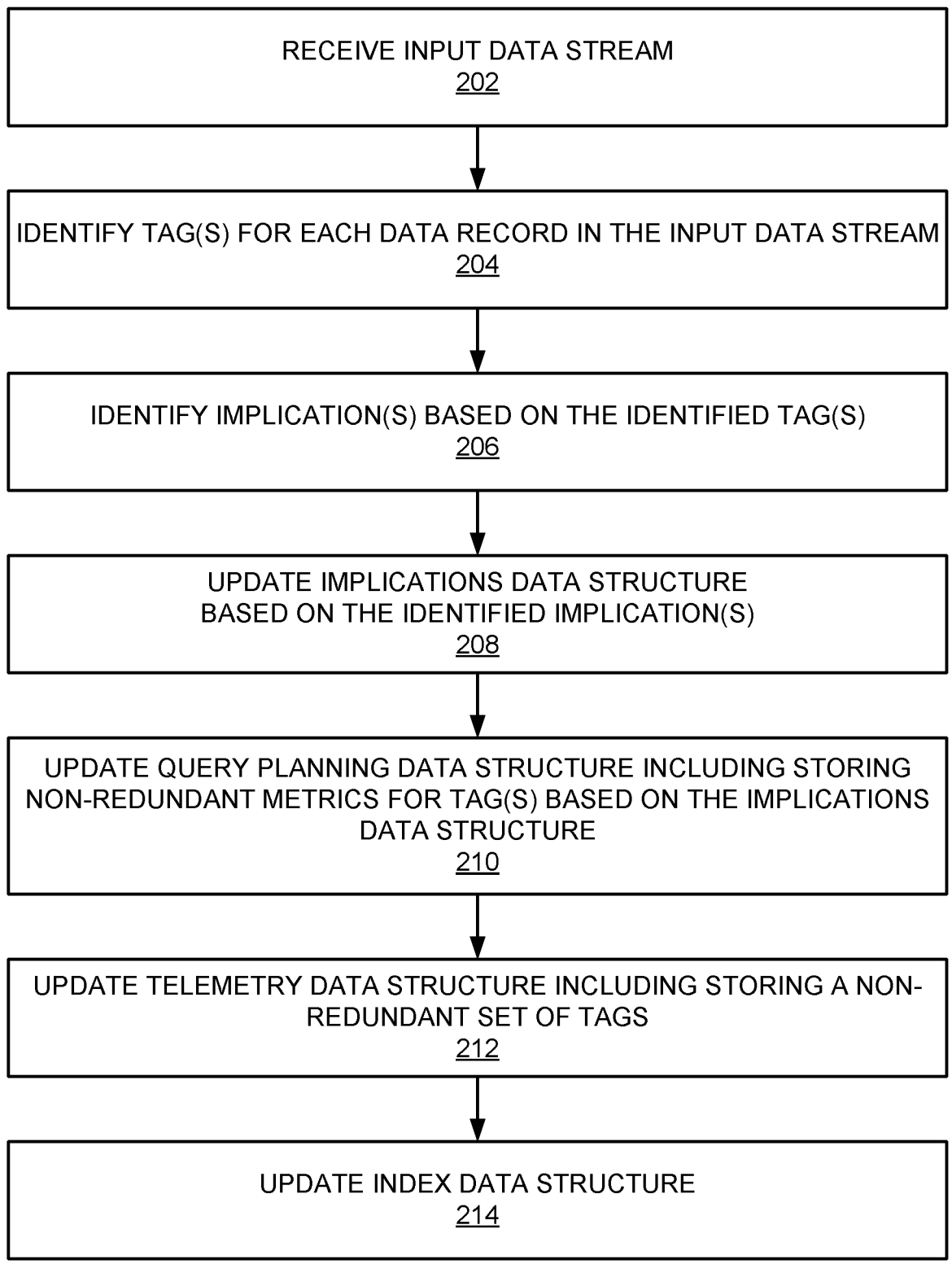
FIG. 2 is a flow chart illustrating an embodiment of a process for tag coexistence detection.

FIG. 2 is a flow chart illustrating an embodiment of a process for tag coexistence detection. The process of FIG. 2 may be at least in part implemented on one or more components of the system shown in FIG. 1. For example, processor 120 may be configured to perform the process with respect to telemetry data 132, index data 134, implications data 142, and query planning data 144. In some embodiments, process 200 is performed by processor 702 shown in FIG. 7.

At 202, an input data stream is received. The input data stream may include one or more data records. Each data record may include one or more identifiers. In various embodiments, the input data stream includes a string. For example, the input data stream may include identifiers encoding information about aspects of associated time series data. Example identifiers include a host, a platform, or a target, among other things. The host may include hardware information or operating system details. The platform may include module-specific information. The target may include product or region information.

At 204, one or more tags are identified for each data record in the input data stream. In various embodiments, a string included in the input data stream is converted to one or more identifiers. Each of the identifiers may be assigned to one of several IDs. Example IDs include a metric ID, a host ID, a tag, and the like. In some embodiments, all IDs are tags but may be given a specific name (e.g., "metric ID") if they have a specific classification. Identifiers may vary from context to context and may be adapted to application needs.

At 206, one or more implications are identified based on the identified tag(s). Implications may be identified from the tags because they are seen together for a particular data record in the input data stream. For example, if tags T1, T2, and T3 are identified for an input stream, then three implications are determined therefrom: T1 implies T1, T2, and T3; T2 implies T1, T2, and T3; and T3 implies T1, T2, and T3. This means that a query for T1 yields the same results as a query for T2 or a query for T3. The identification of implications allows a single set of data to be stored instead of three redundant sets of data in this example of tag T1, T2, and T3.

At 208, an implications data structure is updated based on the identified one or more implications. Referring to the example shown in FIG. 1, implications table 142 is updated. The implications table may be updated to indicate redundancies. Using the example of a set of implications in which T1 implies T1, T2, and T3; T2 implies T1, T2, and T3; and T3 implies T1, T2, and T3, the redundancies indicated are T1, T2, and T3. That is, T1, T2, and T3 can point to a same set of data for query planning purposes. An example of updating the implications table is further described herein with respect to FIG. 3.

At 210, a query planning data structure is updated including storing non-redundant metrics for tags based on the implications data structure. The query planning table may be updated based on the updated implications table (208). An updated query planning table facilitates efficient responses to queries. Referring to the example shown in FIG. 1, query planning table 144 stored in main memory is updated. In some embodiments, in the query planning data structure, each tag has a pointer to a data set. Based on implications information, one or more tags may point to the same data set. For example, if a first tag implies a second tag, the first tag and second tag point to the same data set.

The query planning data structure may optimize query handling by increasing a response speed and optimally utilizing memory compared with systems that do not have a query planning data structure or systems that have a less effective query planning data structure. A data set may be loaded from disk the first time a query associated with the data set is made. Once the data set is loaded to memory from disk, subsequent queries involving the data set may simply retrieve data set information from memory without needing to refer to disk. In one aspect, retrieving a query result from memory instead of disk saves time because there is a smaller space to search for the query response. In another aspect, more non-redundant information can be stored in the query planning data structure because redundant information is not unnecessarily taking up space in the query planning data structure.

Suppose a query planning table stores a single data set of tags T1, T2, and T3 (because T1 implies T1, T2, and T3). A first query is for a data set associated with a first tag, T1, which causes the data set to be loaded from disk into the query planning table. A subsequent query for a data set associated with a second tag, T2, causes the query to be handled with the query planning table without needing to retrieve the data set from disk. Despite a query for tag T2 having never been made before, the query can be quickly handled because a processor determines that T2 implies T1, T2, and T3 and is able to use the data set for tag T1, which has already been loaded into the query planning table.

At 212, a telemetry data structure is updated including storing a non-redundant set of tags. Referring to the example shown in FIG. 1, telemetry table 132 stored in disk is updated. In various embodiments, one of the tags is selected for storage. The tag that is selected to be stored may be based on a variety of metrics to maximize efficiency and storage. In other words, the tag selected for storage may take the least amount of storage space. For example, a lexicographically simplest tag is stored. That is, redundant tags that are lexicographically more complex are not stored in favor of storing one representative tag, where the one representative tag is less complex. As another example, the tag that is stored has a smallest number of bits compared with other redundant tags.

At 214, an index table is updated. Referring to the example shown in FIG. 1, index table 134 stored in disk is updated. In some embodiments, an index table stores a copy of data for each tag. That is, each tag points to its own copy of data. In some embodiments, an index table stores non-redundant data such that tags having a common data set point to a single copy of the data set.

Figure 3:
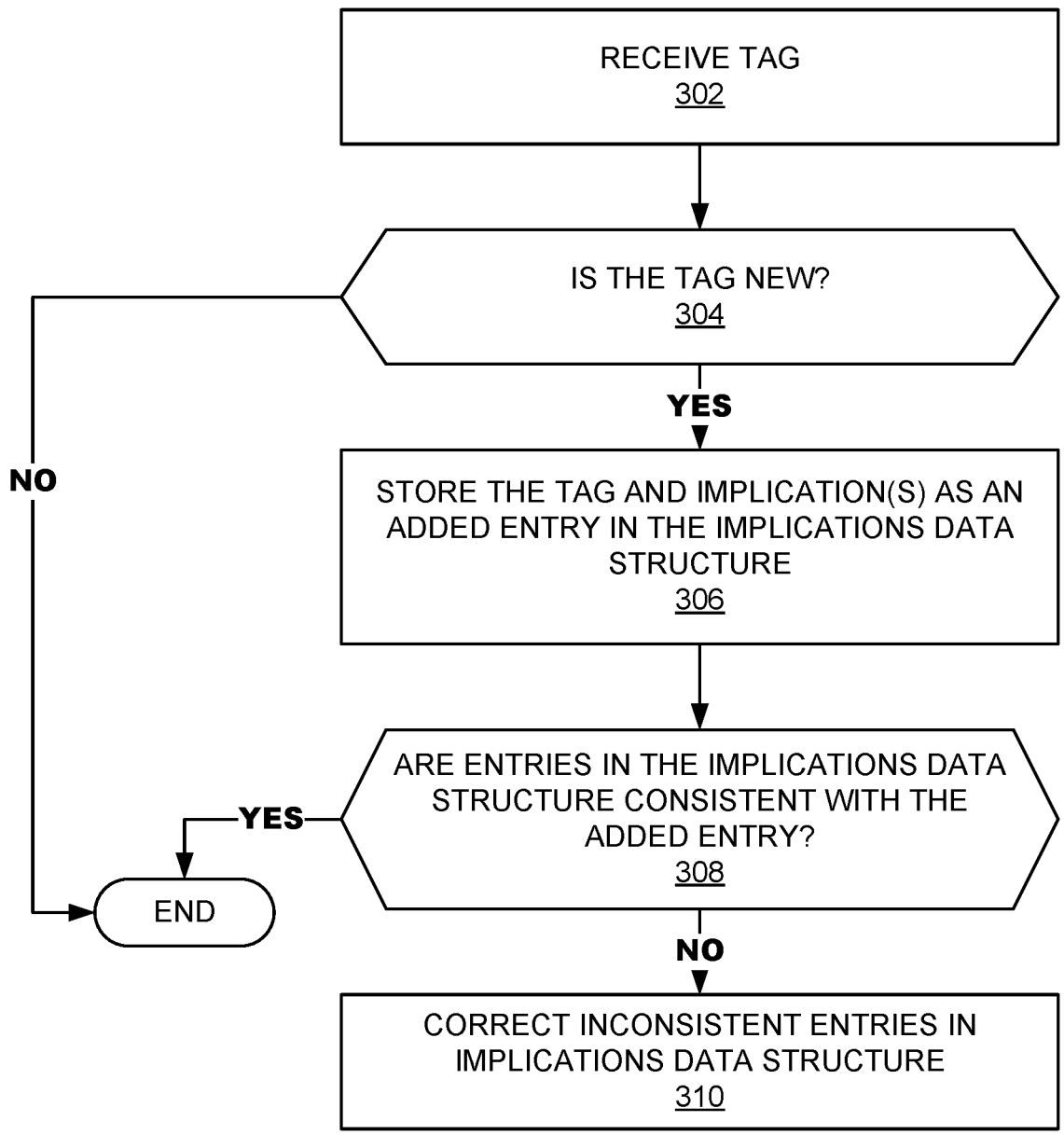
FIG. 3 is a flow chart illustrating an embodiment of a process for tag coexistence detection including updating implications.

FIG. 3 is a flow chart illustrating an embodiment of a process for tag coexistence detection including updating implications. The process of FIG. 3 may be at least in part implemented on one or more components of the system shown in FIG. 1. For example, processor 120 may be configured to perform the process with respect to implications data 142. In some embodiments, at least a portion of the process of FIG. 3 is included in 208 of FIG. 2. In some embodiments, process 300 is performed by processor 702 shown in FIG. 7.

At 302, a tag is received. The tag may be identified from an input data stream. An example of tag identification is described with respect to 204 of FIG. 2

At 304, it is determined whether the tag is new. In various embodiments, a tag is new if the tag has not been previously seen before. Suppose a first input data stream includes tags T1, T2, and T3 and a second input data stream includes tags T2, T3, T4, and T5. When processing the second input data stream tags, tags T4 and T5 are determined to be new because they have not been seen before. Tags T2 and T3 are determined to not be new because they were previously seen in the first input data stream. If the tag is new, the process proceeds to 306.

At 306, the tag and implications are stored as an added entry in the implications data structure. For example, if the implications are T1 implies T1, T2, and T3; T2 implies T1, T2, and T3; and T3 implies T1, T2, and T3, these three implications are stored in the implications data structure.

At 308, it is determined whether the entries in the implications data structure are consistent with the added entry. For example, a previously-stored entry in an implications table may be inconsistent with the added entry because the entry conflicts with the new tag and its implications.

If there are inconsistent entries, the process proceeds to 310 in which inconsistent entries in the implications data structure are corrected. In some embodiments, the implications table does not include any inconsistent entries. For example, the received new tag and its implications are consistent with previously stored entries in the implications table. If there are consistent entries in the implications data structure at 308 or the tag is determined to not be new at 304, the process ends.

Figure 4:
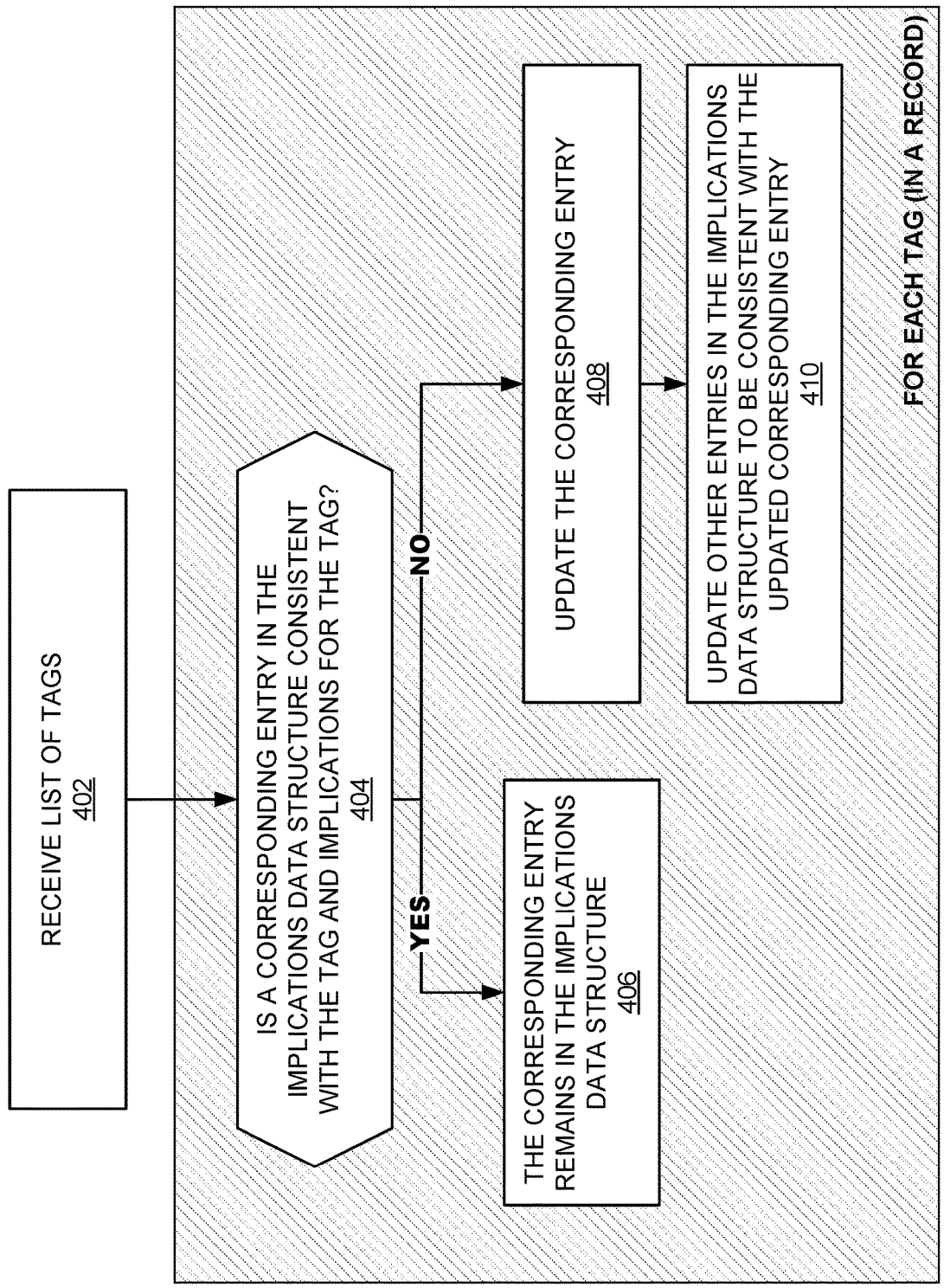
FIG. 4 is a flow chart illustrating an embodiment of a process for tag coexistence detection.

FIG. 4 is a flow chart illustrating an embodiment of a process for tag coexistence detection. The process of FIG. 4 may be at least in part implemented on one or more components of the system shown in FIG. 1. For example, processor 120 may be configured to perform the process with respect to implications data 142. In some embodiments, at least a portion of the process of FIG. 4 is included in 308 and/or 310 of FIG. 3. In some embodiments, process 400 is performed by processor 702 shown in FIG. 7.

At 402, a list of tags is received. In various embodiments, the list of tags includes tags identified from an input data stream such as tags identified in 204 of FIG. 2

404-410 may be performed for each tag in a record, e.g., for each tag in an entry in an implications table. At 404, it is determined whether a corresponding entry in the implications data structure is consistent with the tag and implications for the tag. Suppose a new implication is T2 implies T2, T3, T4, and T5. An entry in which T2 implies T1, T2, T3 is inconsistent with the new implication because T2 does not imply T1. To make the entry consistent with the new implication, the entry may be modified as further described herein.

If the corresponding entry in the implications table is consistent with the tag and implications for the tag, the corresponding entry remains in the implications data structure (406). For example, no changes are made to the entry.

If the corresponding entry in the implications table is inconsistent with the tag and implications for the tag, the corresponding entry is updated (408). For example, those implications that are no longer consistent with the added entry are modified or removed. Referring to the example in which a new implication is T2 implies T2, T3, T4, and T5 being compared with an entry in which T2 implies T1, T2, T3, the entry may be modified to: T2 implies T2, T3.

At 410, other entries in the implications table are updated to be consistent with the updated corresponding entry.

Figure 5:
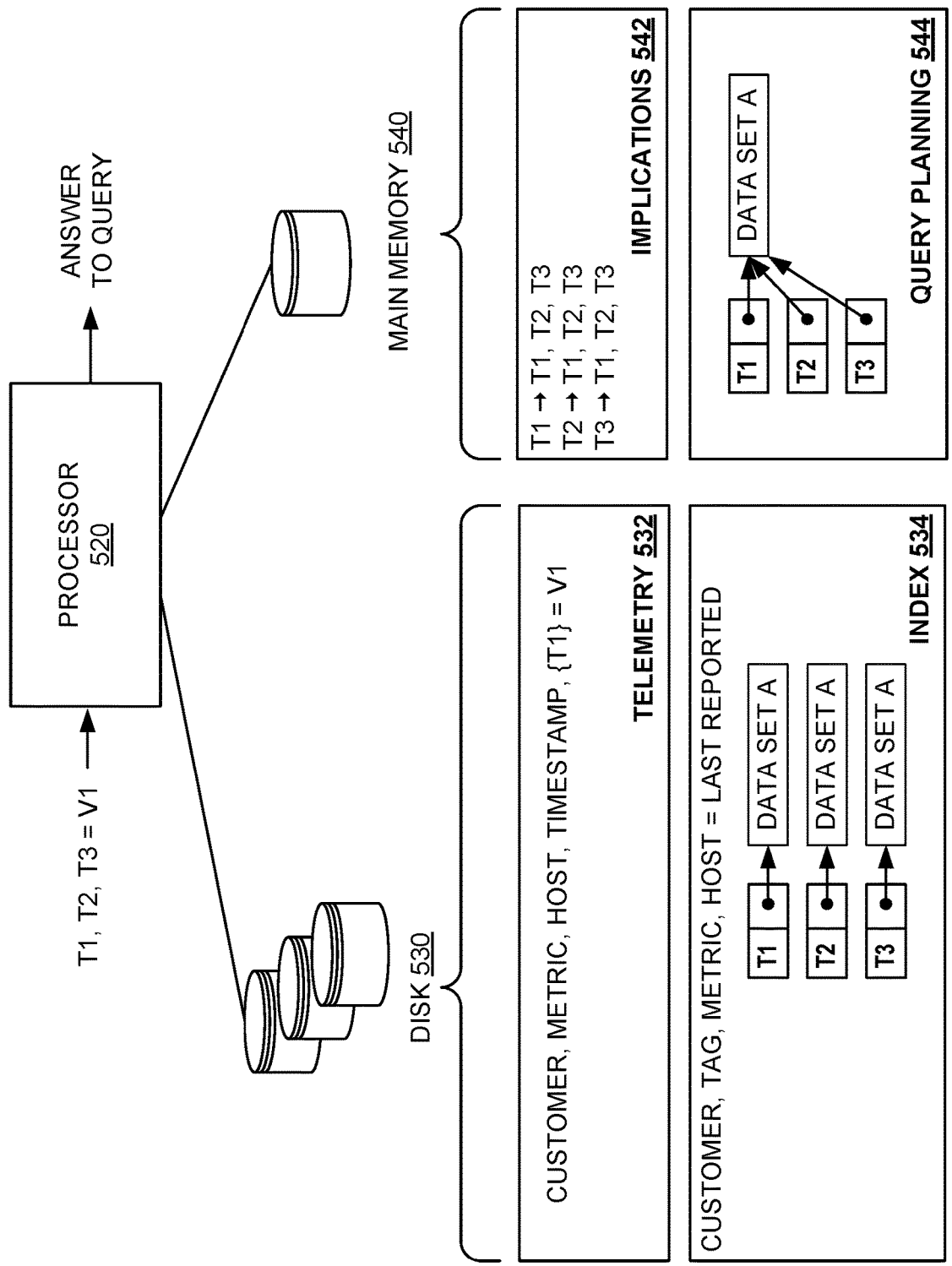
FIG. 5 is a block diagram illustrating an embodiment of a system for tag coexistence detection in a first state.

The processes shown in FIGS. 2-4 will now be explained using the examples of FIGS. 5 and 6. FIG. 5 is a block diagram illustrating an embodiment of a system for tag coexistence detection in a first state. The system includes a processor 520, disk 530, and main memory 540. An example of processor 520 is processor 120 of FIG. 1. An example of disk 530 is disk 130 of FIG. 1. An example of main memory 540 is memory 140 of FIG. 1.

In the first state, contents of telemetry table 532, index table 534, implications table 542, and query planning table 544 are as shown. FIG. 6 is a block diagram illustrating an embodiment of a system for tag coexistence detection in a second state. The system includes a processor 620, disk 630, and main memory 640. An example of processor 620 is processor 120 of FIG. 1. An example of disk 630 is disk 130 of FIG. 1. An example of main memory 640 is memory 140 of FIG. 1. In the second state, contents of telemetry table 632, index table 634, implications table 642, and query planning table 644 are as shown.

In the example shown in FIG. 5, each of the data structures (telemetry table 532, index table 534, implications table 542, and query planning table 544) start out empty. An input data stream is received. In this example, three tags (T1, T2, T3) are identified from the input data stream. The three tags have an associated value, V1.

Implications table 542 may be updated based on the tags of the input data stream as follows. In this example, none of the three tags have been seen before. That is, each of the three tags is "new." Because the tags are new, each tag and its implications are stored as an added entry in the implications table. Referring to implications table 542, an entry for tag T1 is "T1→T1, T2, T3," an entry for tag T2 is "T2→T1, T2, T3," and an entry for tag T3 is "T3→T1, T2, T3." This means that T1 implies T1, T2, T3; T2 implies T1, T2, T3; and T3 implies T1, T2, T3. After the tags have been stored in the implications table, it may be determined whether other entries in the implications table are consistent with the added entries. Here, because the implications table was empty before T1, T2, and T3 were processed, all entries in the implications table are consistent with each other.

Query planning table 544 may be updated based on the updated implications table 542 as follows. An entry for each of the tags, T1, T2, and T3, may be created in the query planning table. Each of the entries points to a same data set, Data Set A, because the implications indicate that T1 implies T1, T2, T3; T2 implies T1, T2, T3; and T3 implies T1, T2, T3.

Telemetry table 532 may be updated based on the updated implications table 542 as follows. The received tags and corresponding values and metrics may be stored as an entry in the telemetry table. For example, value V1 is associated with a customer, metric, host, timestamp, and tag T1. In this example, only tag T1 is stored because T1 implies T1, T2, and T3.

Index table 534 may be updated by storing each of the tags with an associated data set. Here, each of the tags T1, T2, and T3 is stored with a respective copy of Data Set A. In an alternative embodiment (not shown), a single copy is stored. For example, a single copy of Data Set A is stored, and T1, T2, and T3 point to the same copy of Data Set A. This may reduce space needed to store data in the index table 534.

Figure 6:
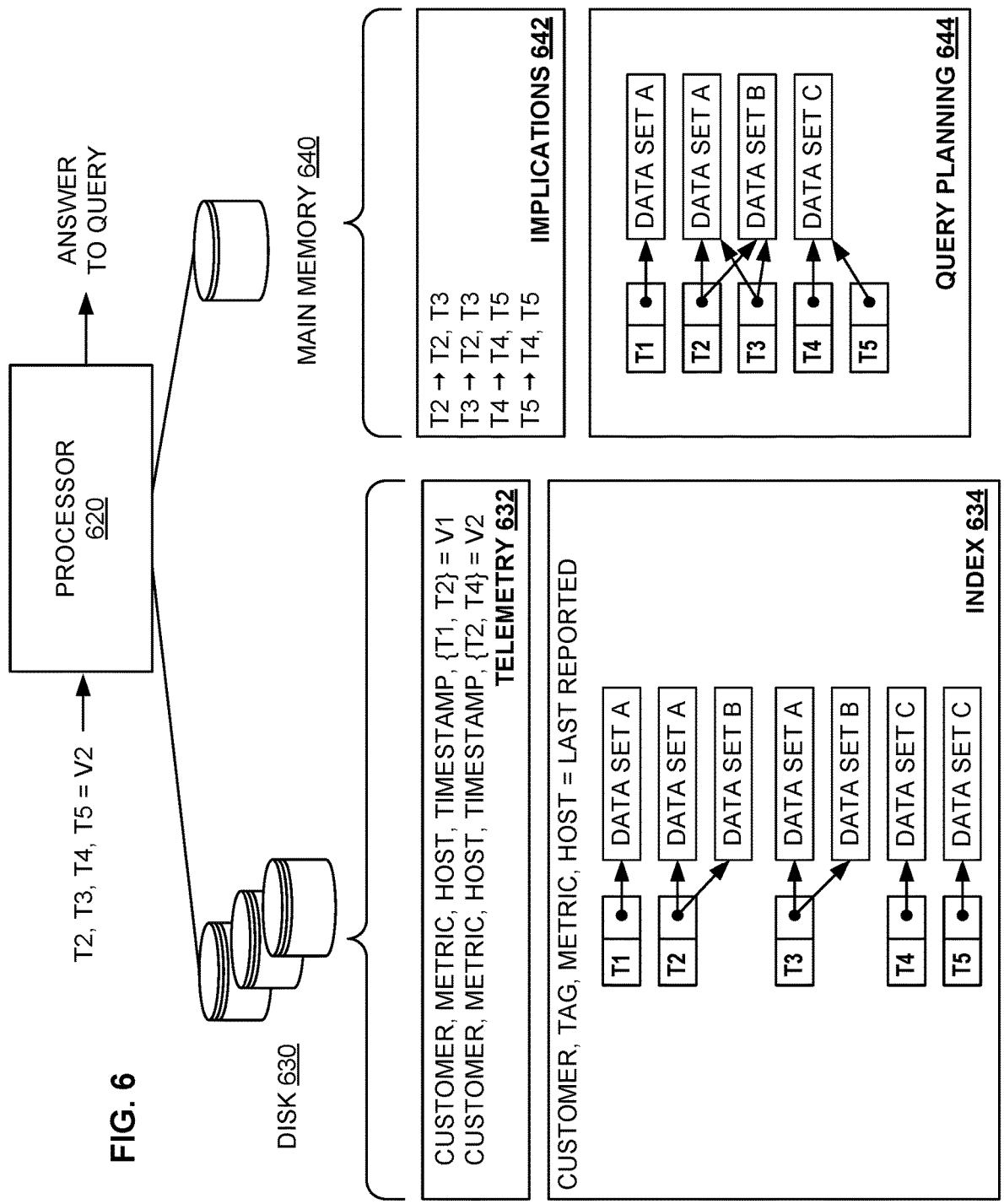
FIG. 6 is a block diagram illustrating an embodiment of a system for tag coexistence detection in a second state.

Referring now to FIG. 6, a second input data stream is received. Here, the second input data stream is received after the first input data stream (T1, T2, T3=V1) is received. In this example, the second input data stream has four tags (T2, T3, T4, and T5). The four tags have an associated value, V2. The implications based on the second input data stream are: T2 implies T3, T4, T5; T3 implies T2, T4, T5; T4 implies T2, T3, T5; and T5 implies T2, T3, T4. Each of the data structures (telemetry table 632, index table 634, implications table 642, and query planning table 644) may be updated in response to the second input data stream. For example, information reflecting the new implications for the second input data stream may be stored in a manner consistent with the implications for the first input data stream.

Implications table 642 may be updated based on the tags of the second input data stream as follows. In this example, tags T2 and T3 have been seen before (they are not new because they were seen in the first input data stream) and tags T4 and T5 are new. With respect to the new tags (T4, T5), the second input data stream indicates the following implications: T4 implies T4, T5; and T5 implies T4, T5.

As shown, implications for tags T4 and T5 (T4 implies T4, T5; and T5 implies T4, T5) are stored as added entries in the implications table 642. After the new implications are stored and before consistency with other entries is checked, the implications table (not shown) contains the following entries: T1 implies T1, T2, T3; T2 implies T1, T2, T3; T3 implies T1, T2, T3; T4 implies T4, T5; and T5 implies T4, T5. In this example, some previously-stored entries are inconsistent with the added entries. In particular, entry T1 implies T1, T2, T3 is inconsistent with implications of the second input data stream because T2 and T3 appear without T1 in the second input data stream. Thus, this entry is removed from the table. Entry T2 implies T1, T2, T3 is inconsistent with implications of the second input data stream because T2 and T3 appear together but without T1. This entry is updated to T2 implies T2, T3 as shown. Entry T3 implies T1, T2, T3 is inconsistent with implications of the second input data stream because T2 and T3 appear together but without T1. This entry is updated to T3 implies T2, T3 as shown. The updating of the implications table 642 to correct inaccuracies results in the implications table shown in FIG. 6.

Query planning table 644 may be updated based on the updated implications table 642 as follows. Query planning table 544 of FIG. 5 shows a first state of the table (before updates). Referring to implications table 642, T1 no longer implies T1, T2, T3. Thus, the pointers from T2 and T3 to the copy of Data Set A associated with T1 are removed. T2 is associated with its own copy of Data Set A and Data Set B. Because T2 implies T2, T3, T3 points to the copy of Data Set A and Data Set B associated with T2. Because T4 implies, T4, and T5, T4 and T5 can both point to the same copy of Data Set C as shown. In various embodiments, query planning table data sets (Data Set A, Data Set B, Data Set C) may be loaded from index table 634 the first time a query is made for a tag. After this retrieval, the corresponding data set is stored in the query planning table and subsequent queries do not trigger a lookup in disk 630. This advantageously improves processing time without a slow initial start-up time, e.g., populating query planning table 644 with data sets before the first query is made.

Telemetry table 632 may be updated based on the updated implications table 642 as follows. Telemetry table 532 of FIG. 5 shows a first state of the table (before updates). For example, value V1 is associated with a customer, metric, host, timestamp, and tag T1. Based on the second input data stream, the first entry is updated to also associate tag T2 with customer, metric, host, timestamp and V1. A second entry is added to associate value V2 with a customer, metric, host, timestamp, and tags T2 and T4.

Index table 634 may be updated by storing each of the tags with an associated data set. Here, each of the tags T1, T2, and T3 is stored with a respective copy of Data Set A. In an alternative embodiment, a single copy is stored. For example, a single copy of Data Set A, Data Set B, and Data Set C is stored. T2 and T3 point to the same copy of Data Set A and Data Set B. This may reduce space needed to store data in the index table 634.

In various embodiments, one or more of the data structures described herein (e.g., telemetry table 132, implications table 142, query planning table 144, and index table 134) are implemented by a bloom filter. The bloom filter may be adjusted for missed pairings. The bloom filter may be programmed to control a frequency of false positives. For example, a false positive rate (e.g., around 1%) may be specified when the bloom filter is created. The bloom filter may track seen tags and typically does not provide false negatives.

Figure 7:
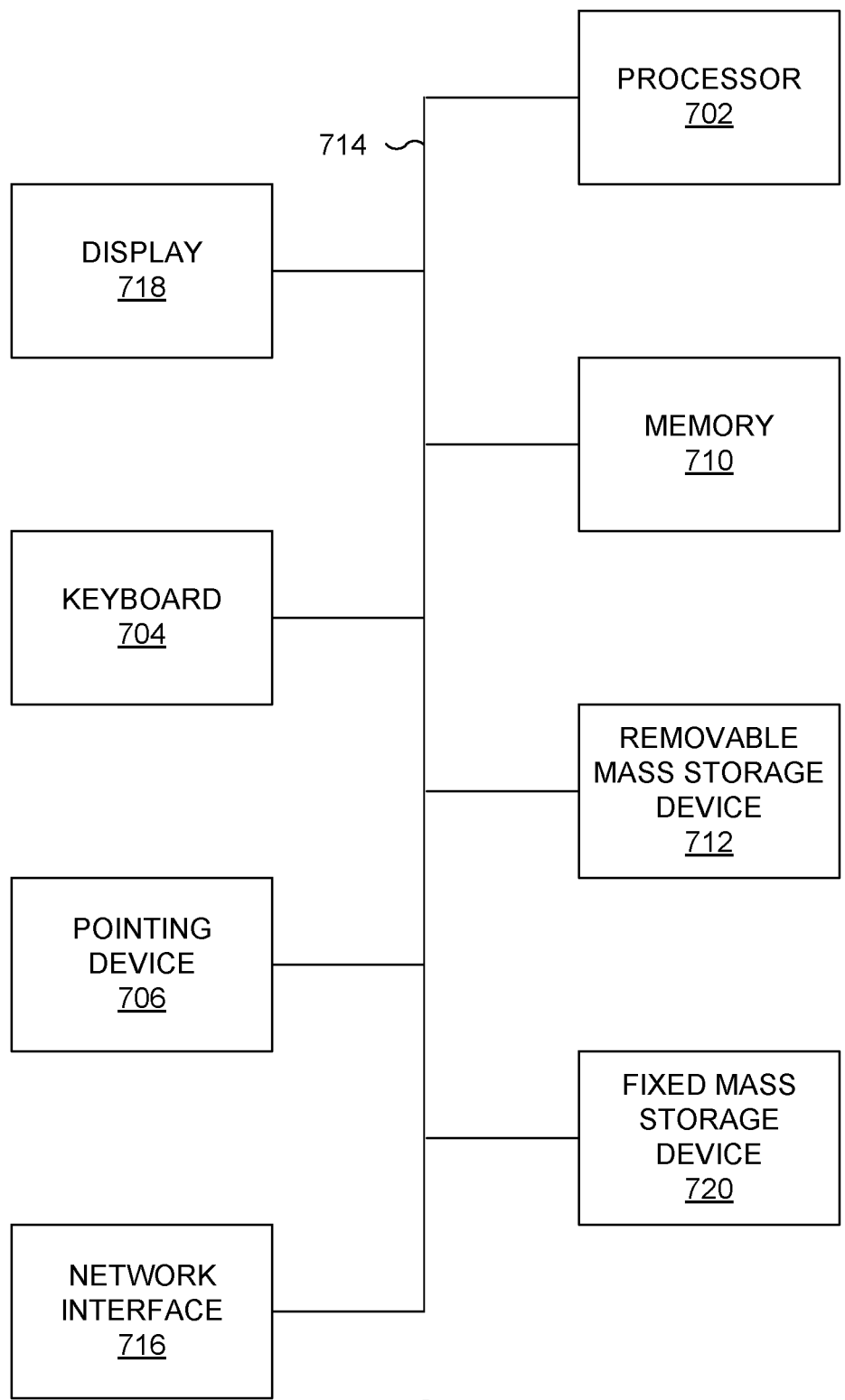
FIG. 7 is a functional diagram illustrating a programmed computer system for tag coexistence detection in accordance with some embodiments.

FIG. 7 is a functional diagram illustrating a programmed computer system for tag coexistence detection in accordance with some embodiments. As will be apparent, other computer system architectures and configurations can be used to detect tag coexistence. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718). In some embodiments, processor 702 includes and/or is used to execute/perform the processes described below with respect to FIGS. 2-4.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storages 712, 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for optimizing data storage, comprising:
   receiving an input time series data stream comprising a plurality of data records, wherein each data record received in the time series data stream is tagged at a source of the input time series data stream with a group of one or more tags;
   identifying one or more implications based on tags that have been observed together in the groups of tags of the plurality of data records, wherein an implication indicates that a query of a first tag has a response that is identical to a query of a second tag;
   for each data record of data records that have been received in the time series data stream, using the group of one or more tags of the corresponding data record to update a data structure tracking coexistence implications of the tags that have been observed together in the groups of tags of the plurality of data records based on the one or more implications;
   receiving a query for execution on the time series data stream;
   using the data structure tracking coexistence implications of tags to optimize the query; and
   executing the query on the time series data stream by performing at least one operation on the time series data stream.

2. The method of claim 1, wherein the use of the data structure to track coexistence implications of tags includes updating a query planning data structure.

3. The method of claim 1, wherein the use of the data structure to track coexistence implications of tags includes updating a query planning data structure to store non-redundant metrics for at least one tag of the group of one or more tags.

4. The method of claim 1, wherein a query planning data structure is stored in a volatile memory.

5. The method of claim 1, wherein the use of the data structure to track coexistence implications of tags includes updating a telemetry data structure.

6. The method of claim 1, wherein the use of the data structure to track coexistence implications of tags includes updating a telemetry data structure to store a non-redundant association of a tag to metrics.

7. The method of claim 1, wherein the use of the data structure to track coexistence implications of tags includes updating an index data structure.

8. The method of claim 1, wherein the use of the group of one or more tags of the corresponding data record to update the data structure tracking coexistence implications of tags includes:
   determining whether a tag of the group of one or more tags is new;
   responsive to the determination that the tag is new, storing the tag and associated implications as an added entry in the data structure;
   determining whether another entry in the data structure is consistent with the added entry; and
   responsive to the determination that the other entry is inconsistent with the added entry, correcting the inconsistent entry in the data structure.

9. The method of claim 1, further comprising using the data structure to reduce a storage size of a stored version of at least one of the received data records.

10. The method of claim 1, further comprising identifying the one or more tags of a data record from the received input time series data stream.

11. The method of claim 1, wherein the data structure is stored in a non-volatile memory.

12. A system for optimizing data storage, comprising:
   a processor configured to:

receive an input time series data stream comprising a plurality of data records, wherein each data record received in the time series data stream is tagged at a source of the input time series data stream with a group of one or more tags;

identify one or more implications based on tags that have been observed together in the groups of tags of the plurality of data records, wherein an implication indicates that a query of a first tag has a response that is identical to a query of a second tad;

for each data record of data records that have been received in the time series data stream, use the group of one or more tags of the corresponding data record to update a data structure tracking coexistence implications of the tags that have been observed together in the groups of tags of the plurality of data records based on the one or more implications;

receive a query for execution on the time series data stream;

use the data structure tracking coexistence implications of tags to optimize the query; and execute the query on the time series data stream by performing at least one operation on the time series data stream; and a volatile memory coupled to the processor and configured to store the data structure tracking coexistence implications of tags that have been observed together in the groups of tags of the data records.

13. The system of claim 12, wherein the volatile memory is further configured to store a query planning data structure, wherein the query planning data structure optimizes responses to queues.

14. The system of claim 13, wherein the use of the data structure to track coexistence implications of tags includes updating the query planning data structure.

15. The system of claim 13, wherein the use of the data structure to track coexistence implications of tags includes updating the query planning data structure to store non-redundant metrics for at least one tag of the group of one or more tags.

16. The system of claim 12, further comprising a non-volatile memory coupled to the processor and configured to store a telemetry data structure, wherein the telemetry data structure is configured to store a non-redundant association of a tag to metrics.

17. The system of claim 16, wherein the use of the data structure to track coexistence implications of tags includes updating the telemetry data structure to remove a redundant association of a tag to metrics.

18. The system of claim 12, further comprising a non-volatile memory coupled to the processor and configured to store an index data structure.

19. The system of claim 12, wherein the processor is further configured to use the data structure to reduce a storage size of a stored version of at least one of the received data records.

20. A computer program product for optimizing data storage, the computer program product being embodied in a non-transitory computer readable storage medium and comprising computer instructions for:

receiving an input time series data stream comprising a plurality of data records, wherein each data record received in the time series data stream is tagged at a source of the input time series data stream with a group of one or more tags;

identifying one or more implications based on tags that have been observed together in the groups of tags of the plurality of data records, wherein an implication indicates that a query of a first tag has a response that is identical to a query of a second tag;

for each data record of data records that have been received in the time series data stream, using the group of one or more tags of the corresponding data record to update a data structure tracking coexistence implications of the tags that have been observed together in the groups of tags of the plurality of data records based on the one or more implications;

receiving a query for execution on the time series data stream;

using the data structure tracking coexistence implications of tags to optimize the query; and executing the query on the time series data stream by performing at least one operation on the time series data stream.

* * * * *